United States Patent
Witte et al.

(10) Patent No.: US 6,472,448 B2
(45) Date of Patent: Oct. 29, 2002

(54) HALOGEN-FREE, FLAME-RETARDANT RIGID POLYURETHANE FOAM AND A PROCESS FOR ITS PRODUCTION

(75) Inventors: Anne Witte, Greven; Wilfried Krieger, Brühl, both of (DE)

(73) Assignee: Clariant GmbH, Frankfurt (DE)

(*) Notice: Subject to any disclaimer, the term of this patent is extended or adjusted under 35 U.S.C. 154(b) by 0 days.

(21) Appl. No.: 09/818,417

(22) Filed: Mar. 27, 2001

(65) Prior Publication Data

US 2001/0036973 A1 Nov. 1, 2001

(30) Foreign Application Priority Data

Mar. 27, 2000 (DE) .......................................... 100 14 593

(51) Int. Cl.⁷ .............................................. C08G 18/14
(52) U.S. Cl. ..................... 521/169; 521/107; 521/108; 521/128; 521/155; 521/164; 521/167; 521/170; 521/174
(58) Field of Search ................................ 521/107, 108, 521/128, 155, 164, 167, 169, 170, 174

(56) References Cited

U.S. PATENT DOCUMENTS

| | | | |
|---|---|---|---|
| 4,248,930 A | 2/1981 | Hass et al. | |
| 4,263,408 A | 4/1981 | Meyborg et al. | |
| 4,367,295 A | 1/1983 | von Bonin | |
| 4,831,062 A | 5/1989 | von Bonin | |
| 5,608,100 A | 3/1997 | Sicken | |
| 5,776,992 A | * 7/1998 | Jung et al. | 521/107 |
| 5,985,965 A | * 11/1999 | Sicken et al. | 521/107 |

FOREIGN PATENT DOCUMENTS

| | | |
|---|---|---|
| DE | 27 32 292 | 2/1979 |
| DE | 28 32 253 | 1/1980 |
| DE | 36 25 556 | 2/1988 |
| DE | 38 03 030 | 8/1989 |
| DE | 43 42 972 | 6/1995 |
| DE | 44 46 847 | 7/1996 |
| DE | 197 44 426 | 7/1999 |
| EP | 0 051 106 | 5/1982 |
| EP | 0 632 046 | 1/1995 |
| EP | 0 665 251 | 8/1995 |

OTHER PUBLICATIONS

Von W. Siefkin, Justus Liebigs Annalen der Chemie, 562, pp. 75–136, Dec. 11, 1948.
Carl Hanser Verlag, Kunststoff–Handbuch [Plastic handbook], vol. VII, pp. 104 to 123, Munich, 1993.
English Abstract for EP0051106, Jan. 4, 1983.
English Abstract for DE4446847, Jul. 3, 1996.
English Abstract for DE3625556, May 16, 1989.
English Abstract for DE19744426, Apr. 14, 1999.
Derwent Patent Abstract for DE 38 03 030 (8/89).
EPO Search Report for Application No. 01106658.6, mail date Dec. 21, 2001.
English abstract for EP 0632046 Jan. 4, 1995.
English abstract for EP 0665251, Aug. 2, 1995.
Abstract XP–002172650 for Yanchuk, N. I., "Formation reaction of phosphorous–containing polyurethanes"(1997).
English abstract XP–002172651 for JP 52–027721 (1977).
U.S. Application No. 09/825,560, filed Mar. 27, 2001.
U.S. Application No. 09/825,559, filed Mar. 27, 2001.

* cited by examiner

*Primary Examiner*—John M. Cooney, Jr.
(74) *Attorney, Agent, or Firm*—Anthony A. Bisulca

(57) ABSTRACT

The invention relates to a halogen-free, flame-retardant rigid polyurethane foam, wherein a combination of oxalkylated alkylphosphonic acids and ammonium polyphosphate is present as flame retardant, and to a process for its production.

The invention also relates to the use of oxalkylated alkylphosphonic acids in a mixture with ammonium polyphosphate for producing halogen-free, flame-retardant rigid polyurethane foams of this type.

11 Claims, No Drawings

HALOGEN-FREE, FLAME-RETARDANT RIGID POLYURETHANE FOAM AND A PROCESS FOR ITS PRODUCTION

FIELD OF THE INVENTION

The invention relates to a halogen-free, flame-retardant rigid polyurethane foam, to a process for its production, and also to the use of oxalkylated alkylphosphonic acids in a mixture with ammonium polyphosphate for producing halogen-free, flame-retardant rigid polyurethane foams of this type.

BACKGROUND OF THE INVENTION

Rigid polyurethane foams are used in many sectors, for example in the refrigeration industry, as insulating materials for construction, for example for heating units or composites, as packaging, and generally as industrial insulation. Rigid polyurethane foams generally have to be provided with flame retardants in order to achieve the high fire-protection requirements desirable in these sectors and sometimes required by legislation. A wide variety of different flame retardants is known and commercially available for this purpose. However, there are often considerable technical problems and toxicological concerns restricting the use of these flame retardants.

For example, when solid flame retardants such as melamine, ammonium polyphosphate or ammonium sulfate are used there are technical problems with metering which frequently necessitate complicated rebuilds or modifications of foaming plants.

Halogen-free flame retardant systems are preferred in principle for reasons of environmental toxicity, and also due to their better performance in terms of the smoke density and smoke toxicity associated with fires.

For flexible polyurethane foam systems, hydroxylated oligomeric phosphoric esters (DE-A 43 42 972) can be used as flame retardants. It is known that these compounds and their properties and effects cannot be similarly used in rigid polyurethane foam systems.

Although in principle flexible and rigid polyurethane foam systems may have approximately the same density and composition, flexible polyurethane foams have only slight crosslinking and exhibit only a low level of resistance to deformation under pressure.

In contrast, the structure of rigid polyurethane foams is composed of highly crosslinked units, and rigid polyurethane foam has very high resistance to deformation under pressure. A typical rigid polyurethane foam is of closed-cell type and has low thermal conductivity.

During the production of polyurethanes, which proceeds via the reaction of polyols with isocyanates, it is primarily the nature and chemistry of the polyol (functionality) which affects the subsequent foam structure and the properties of this material.

SUMMARY OF THE INVENTION

It is an object of the present invention to provide a flame-retardant rigid polyurethane foam and also a process for its production which does not have the abovementioned disadvantages and which gives products which meet the necessary and prescribed requirements for flame retardancy, processability, low smoke density and low smoke toxicity.

DESCRIPTION OF THE PREFERRED EMBODIMENTS

The abovementioned object is achieved by means of a rigid polyurethane foam of the type mentioned at the outset, wherein a combination of oxalkylated alkylphosphonic acids and ammonium polyphosphate is present as flame retardant.

The oxalkylated alkylphosphonic acids preferably have the formula I

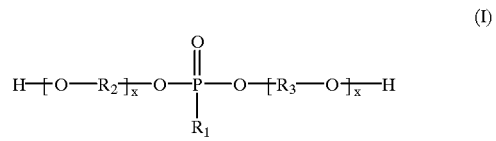

where
R$_1$ is a methyl, ethyl or propyl radical,
R$_2$ and R$_3$ are identical or different and are a methyl, ethyl or propyl radical and x is a number from 1.2 to 1.9.

In the rigid polywethane foam according to the invention, the ratio by weight in which the oxalkylated alkylphosphoric acids and ammonium polyphosphate are present is preferably from 1:2 to 2:1.

The ratio by weight in which the oxalkylated alkylphosphonic acids and ammonium polyphosphate are present is preferably 1:1.

The halogen-free, flame-retardant rigid polyurethane foam preferably comprises, based on the fully cured rigid polyurethane foam, from 0.1 to 30% by weight of the flame retardant.

It particularly preferably comprises, based on the fully cured rigid polyurethane foam, from 3 to 15% by weight of the flame retardant.

The rigid polyurethane foam preferably has a density of from 25 to 80 kg/m$^3$.

The rigid polyurethane foam particularly preferably has a density of from 30 to 50 kg/m$^3$.

The abovementioned object is also achieved by means of a process for producing a halogen-free, flame-retardant rigid polyurethane foam from polyisocyanates and polyols in the presence of blowing agents, stabilizers, activators and/or other conventional auxiliaries and additives, which comprises reacting organic polyisocyanates with compounds having at least 2 hydrogen atoms capable of reaction with isocyanates, in the presence of blowing agents, stabilizers and a flame-retardant combination of oxalkylated alkylphosphonic acids of the formula I and ammonium polyphosphate.

The blowing agent is preferably water and/or pentane. The oxethylated alkylphosphonic acids of the formula I are preferably compounds liquid at processing temperature. For the purposes of the present invention, processing temperature is the temperature at which the starting components are mixed.

The oxethylated alkylphosphonic acids of the formula I are preferably compounds reactive toward isocyanates.

The invention also provides the use of oxethylated alkylphosphonic acids of the formula I in a mixture with ammonium polyphosphate as halogen-free flame retardant for producing flame-retardant rigid polyurethane foam systems.

Regarding the rigid polyurethane foams: These are mainly foams having urethane groups and/or isocyanurate groups and/or allophanate groups and/or uretdione groups and/or urea groups and/or carbodiimide groups. The use according to the invention preferably takes place during the production of polyurethane foams or of polyisocyanurate foams.

The materials used for producing the isocyanate-based foams are: Starting materials: aliphatic, cycloaliphatic, araliphatic, aromatic or heterocyclic polyisocyanates (see, for example, W. Siefken in Justus Liebigs Annalen der Chemie, 562, pp. 75-136), for example those of the formula Q(NCO)$_n$, where n=from 2 to 4, preferably from 2 to 3, and Q is an aliphatic hydrocarbon radical having from 2 to 18 carbon atoms, preferably from 6 to 10 carbon atoms, a cycloaliphatic hydrocarbon radical having from 4 to 15 carbon atoms, preferably from 5 to 10 carbon atoms, an aromatic hydrocarbon radical having from 6 to 15 carbon atoms, preferably from 6 to 13 carbon atoms, or an araliphatic hydrocarbon radical having from 8 to 15 carbon atoms, preferably from 8 to 13 carbon atoms, for example the polyisocyanates described in DE-A 28 32 253, pp. 10-11. Particular preference is generally given to the polyisocyanates readily available industrially and derived from tolylene 2,4- and/or 2,6-diisocayanate or from diphenylmethane 4,4'- and/or 2,4'-diisocyanate. Other starting materials are compounds having at least two hydrogen atoms capable of reaction with isocyanates, with a molecular weight of from 400 to 10,000 ("polyol component"). For the purposes of the present invention, these are compounds having amino groups, thio groups or carboxyl groups, and preferably compounds having hydroxyl groups, in particular from 2 to 8 hydroxyl groups, and specifically those of molecular weight from 1000 to 6000, preferably from 2000 to 6000, and are generally polyethers or polyesters dihydric to octahydric, preferably dihydric to hexahydric, or else polycarbonates or polyesteramides, as known per se for the production of homogenous or of cellular polyurethanes, and as described in DE-A 28 32 253, for example. The at least dihydric polyethers and polyesters are preferred according to the invention.

Other starting materials which may be used if desired are compounds having at least two hydrogen atoms capable of reaction with isocyanates and with a molecular weight of from 32 to 399. In this case, again, for the purposes of the present invention these are compounds having hydroxyl groups and/or amino groups and/or thio groups and/or carboxyl groups, preferably compounds having hydroxyl groups and/or amino groups, and serving as chain extenders or crosslinkers. These compounds generally have from 2 to 8, preferably from 2 to 4, hydrogen atoms capable of reaction with isocyanates. Examples of these are again described in DE-A 28 32 253.

If desired, concomitant use is made of auxiliaries and additions, such as catalysts of the type known per se, surface-active additives, such as emulsifiers and foam stabilizers, reaction inhibitors, e.g. substances of acid reaction, such as hydrochloric acid or organic acid halides, or else cell regulators of the type known per se, such as paraffins or fatty alcohols, or dimethylpolysiloxanes, or else pigments or dyes, or other flame retardants, core-discoloration inhibitors, or else stabilizers to counteract aging or weathering, or plasticizers or fungistatic or bacteriostatic substances, or else fillers, such as barium sulfate, kieselguhr, carbon black or whiting (DE-A 27 32 292).

Pages 104 to 123 of Kunststoff-Handbuch [Plastics Handbook], Vol. VII, Carl Hanser Verlag, Munich, 1993 describe further examples of surface-active additives and foam stabilizers which may, if desired, be used concomitantly according to the invention, and also cell regulators, reaction inhibitors, stabilizers, flame-retardant substances, plasticizers, dyes and fillers, and also fungistatic or bacteriostatic substances, together with details of the manner of use of these additions, and of their manner of action.

Polyisocyanurate foams are produced using the processes and conditions known for this purpose.

EXAMPLES

The examples below illustrate the invention.
The following constituents were used for the experiments:

OMPA: Oxethylated methylphosphonic acid having a phosphorus content of 12.7% by weight, a hydroxyl value of 430 mg of KOH/g and a viscosity of 275 mPa s at 25° C.

OEPA: Oxethylated ethylphosphonic acid having a phosphorus content of 12.2% by weight, a hydroxyl value of 447 mg of KOH/g and a viscosity of 190 mPa s at 25° C.

OPPA: Oxethylated propylphosphonic acid having a phosphorus content of 12.3% by weight, a hydroxyl value of 421 mg of KOH/g and a viscosity of 160 mPa s at 25° C.

®Exolit AP422: Ammonium polyphosphate. (Manufacturer in each case: Clariant GmbH)

| | |
|---|---|
| Polyetherpolyol | ®Lupranol 3323, BASF, a polyether polyol having a hydroxyl value of 340 mg of KOH/g |
| Catalysts | N,N-Dimethylcyclohexylamine, Merck-Schuchardt |
| Stabilizer | ®Tegostab B8466, Th. Goldschmidt AG, a polyether-modified polysiloxane |
| Isocyanate | Caradate 30, ICI-Huntsman |

Examples 1 to 3

A water-blown rigid polyurethane foam (Index 110) with a density of about 40 kg/m$^3$ was produced to the following mixing specification (data in parts by weight):

| Component | Example 1 | Example 2 | Example 3 (comparison) |
|---|---|---|---|
| Polyol Lupranol 3323 | 100.0 | 100.0 | 100.0 |
| Flame retardant | 20 Exolit AP422 20 OMPA | 20 Exolit AP 422 20 OEPA | 20 Exolit AP422 25 Levagord 40 SON |
| Catalyst DMCHA | 2.5 | 2.5 | 2.5 |
| Stabilizer Tegostab B 8466 | 3.0 | 3.0 | 3.0 |
| Blowing agent Water/pentane | 2.3/9 | 2.3/9 | 2.3/9 |
| Isocyanate Caradate 30 | Index 110 | Index 110 | Index 110 |

To prepare the rigid polyurethane foam, the components were mixed in the prescribed sequence, and foamed.

Fire performance testing

Fire performance is classified to DIN 4102 using the small burner test. If the requirements are complied with in the small burner test, the classification is B2. If the marking applied on the vertically arranged test sheet 150 mm above the point of flame application is reached by the upper boundaries of the flames within 15 seconds, the specimen tested is regarded as of high flammability, i.e. is allocated to building materials class B3.

Each of the abovementioned rigid polyurethane foams of the invention passed the B2 test to DIN 4102. In addition, the result of measuring smoke density either under smoldering conditions or under flaming conditions was that this was reduced by a factor of from 3 to 10 in comparison with rigid polyurethane foams provided with halogen-containing flame retardants instead of the mixture of ammonium polyphosphate and the oxalkylated alkylphosphonic acids.

The product from Example 3 (comparison) did not pass the B2 test.

What is claimed is:

1. A halogen-free, flame-retardant rigid polyurethane foam, wherein a combination of oxalkylated alkylphosphonic acids and ammonium polyphosphate is present as flame retardant, and wherein the oxalkylated alkylphosphonic acids have the formula I

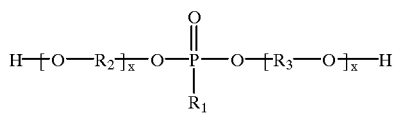
(I)

where
- $R_1$ is a methyl, ethyl or propyl radical,
- $R_2$ and $R_3$ are identical or different and are a methyl, ethyl or propyl radical and
- x is a number from 1.2 to 1.9.

2. The halogen-free, flame-retardant rigid polyurethane foam as claimed in claim 1, wherein the ratio by weight in which the oxalkylated alkylphosphonic acids and ammonium polyphosphate are present is from 1:2 to 2:1.

3. The halogen-free, flame-retardant rigid polyurethane foam as claimed in claim 1, wherein the ratio by weight in which the oxalkylated alkylphosphonic acids and ammonium polyphosphate are present is 1:1.

4. The halogen-free, flame-retardant rigid polyurethane foam as claimed in claim 1, which comprises, based on the fully cured rigid polyurethane foam, from 0.1 to 30% by weight of the flame retardant.

5. The halogen-free, flame-retardant rigid polyurethane foam as claimed in claim 1, which comprises, based on the fully cured rigid polyurethane foam, from 3 to 15% by weight of the flame retardant.

6. The halogen-free, flame-retardant rigid polyurethane foam as claimed in claim 1, which has a density of from 25 to 80 kg/m³.

7. The halogen-free, flame-retardant rigid polyurethane foam as claimed in claim 1, which has a density of from 30 to 50 kg/m³.

8. A process for producing a halogen-free, flame-retardant rigid polyurethane foam comprising the steps of reacting organic polyisocyanates with compounds having at least 2 hydrogen atoms capable of reaction with isocyanates, in the presence of blowing agents, stabilizers, and a flame-retardant combination of ammonium polyphosphate and oxalkylated alkylphosphonic acids of the formula I:

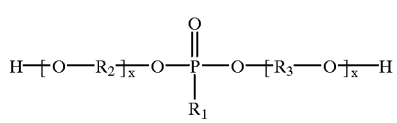
(I)

where
- $R_1$ is a methyl, ethyl or propyl radical,
- $R_2$ and $R_3$ are identical or different and are a methyl, ethyl or propyl radical and
- x is a number from 1.2 to 1.9.

9. The process as claimed in claim 8, wherein the blowing agent is water and/or pentane.

10. The process as claimed in claim 8, wherein the oxalkylated alkylphosphonic acids of the formula I are compounds liquid at processing temperature.

11. The process as claimed in claim 8, wherein the oxalkylated alkylphosphonic acids of the formula I are compounds reactive toward isocyanates.

* * * * *